Dec. 4, 1951 R. MOSER 2,577,261
MACHINE FOR INSERTING SUPPLEMENTS INTO SIGNATURES
Filed March 19, 1947 13 Sheets-Sheet 1
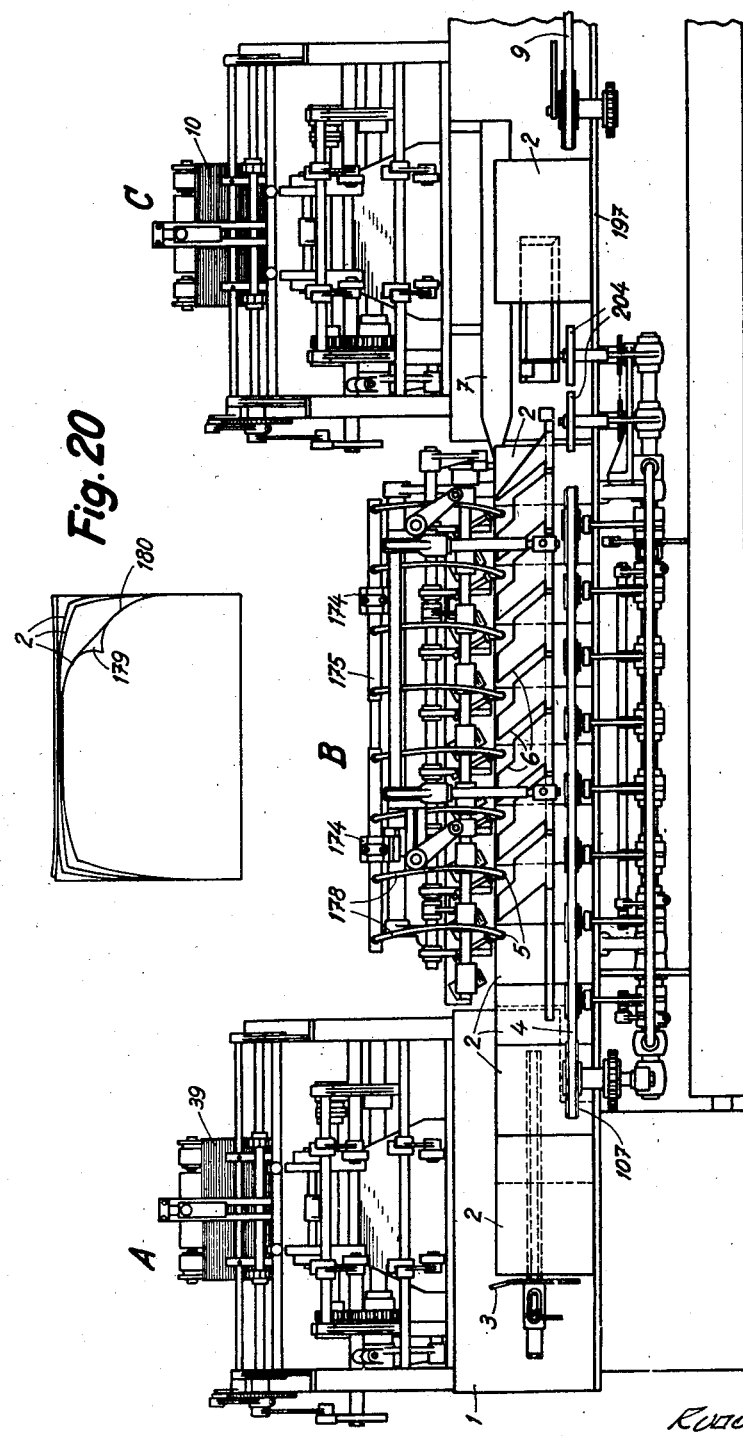

Dec. 4, 1951 R. MOSER 2,577,261
MACHINE FOR INSERTING SUPPLEMENTS INTO SIGNATURES
Filed March 19, 1947 13 Sheets-Sheet 2
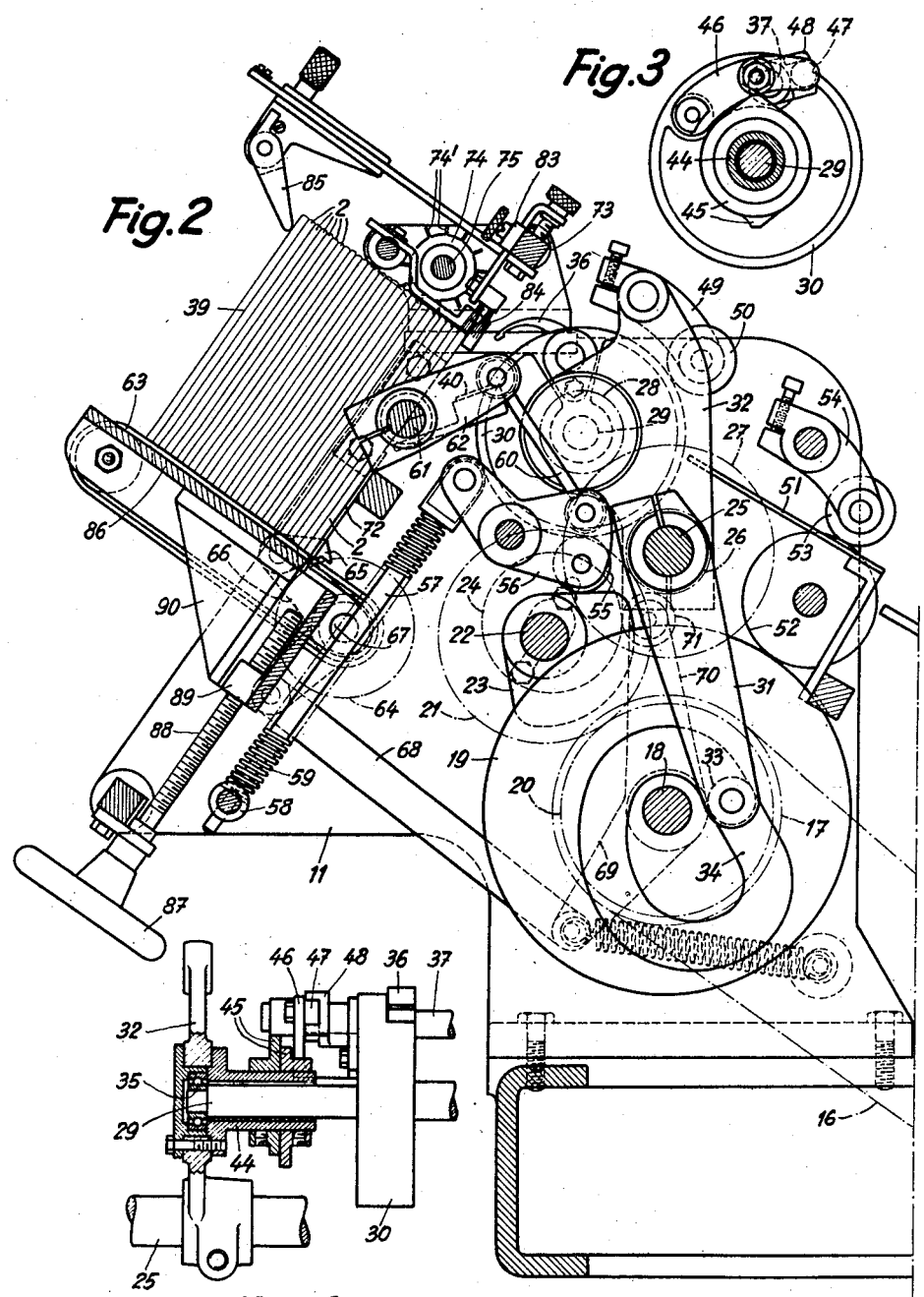
INVENTOR
RUDOLF MOSER
BY Young, Emery & Thompson
ATTYS Dec. 4, 1951 R. MOSER 2,577,261
MACHINE FOR INSERTING SUPPLEMENTS INTO SIGNATURES
Filed March 19, 1947 13 Sheets-Sheet 3
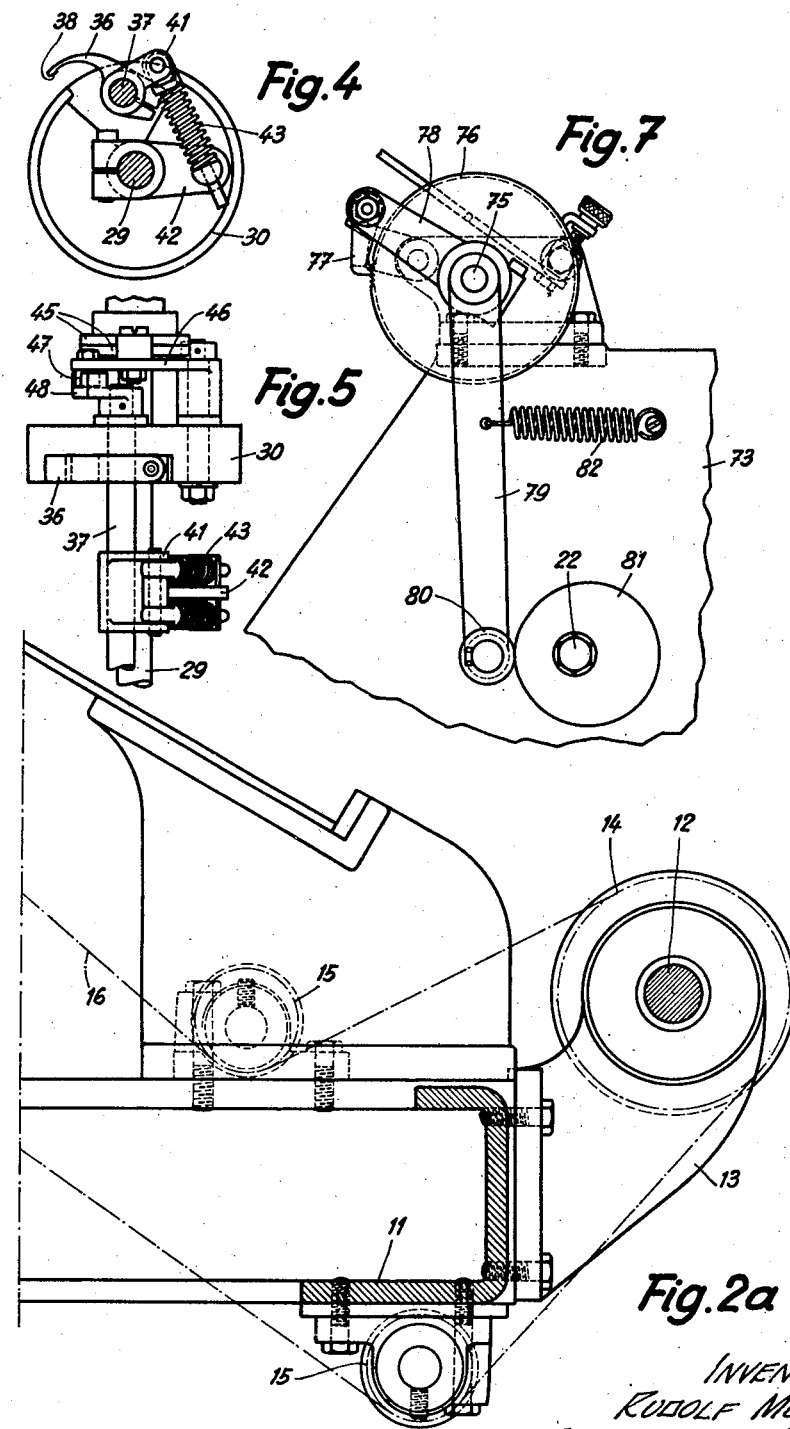
INVENTOR
RUDOLF MOSER
BY Young, Emery & Thompson
ATTYS-

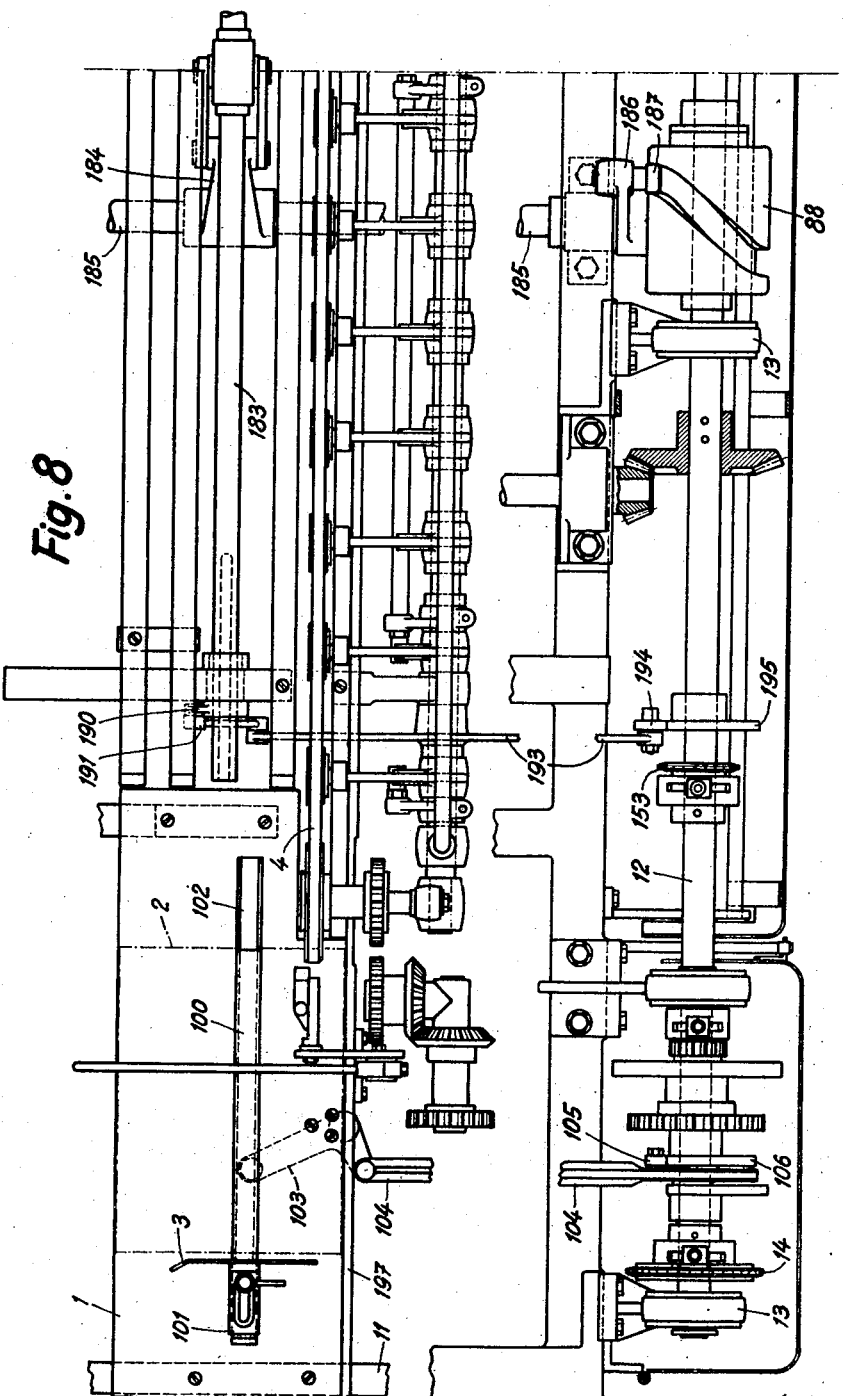

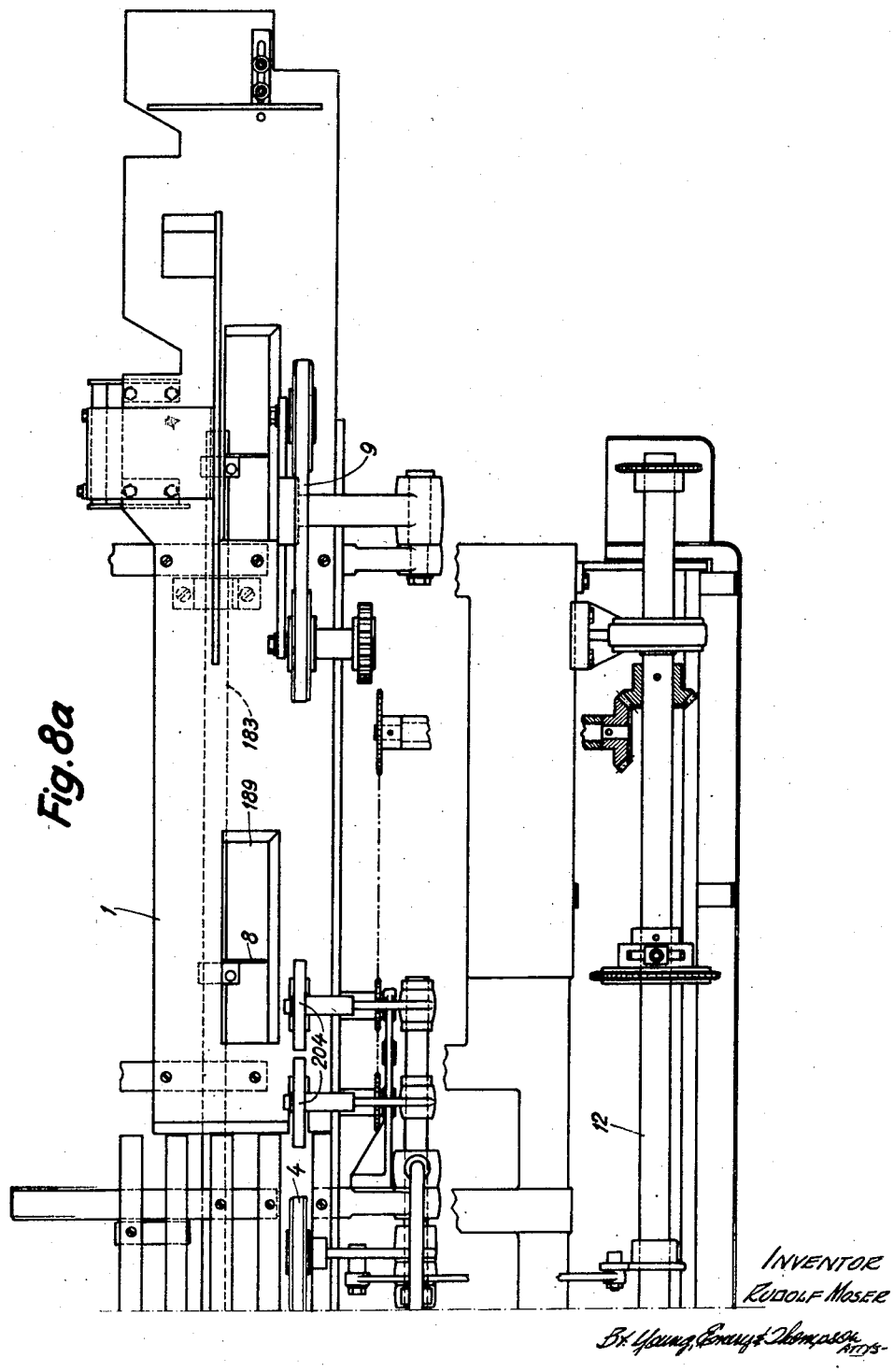

Dec. 4, 1951   R. MOSER   2,577,261
MACHINE FOR INSERTING SUPPLEMENTS INTO SIGNATURES
Filed March 19, 1947   13 Sheets-Sheet 7
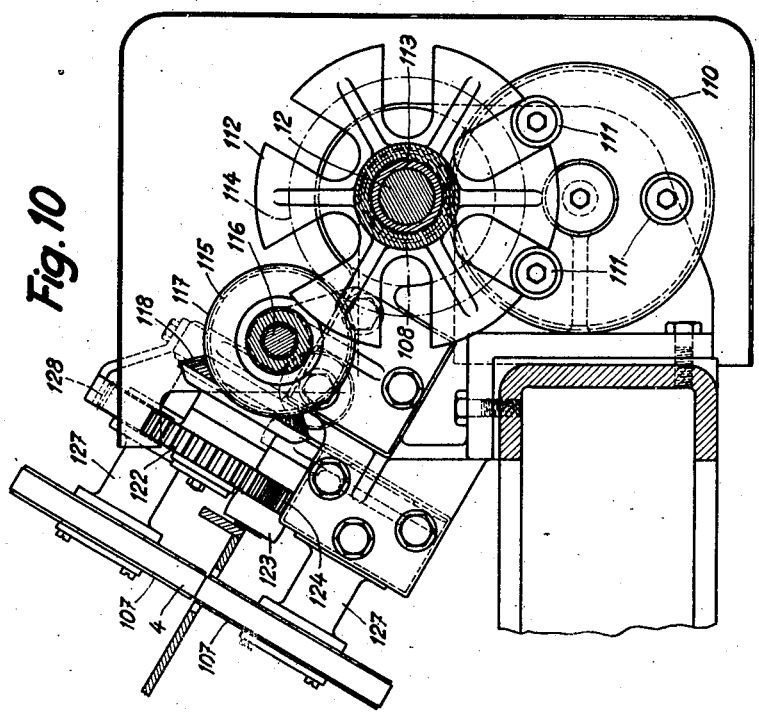
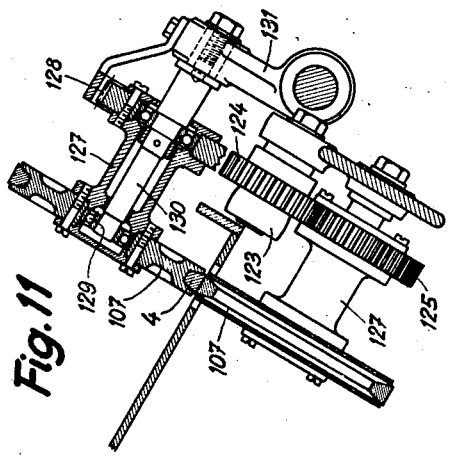
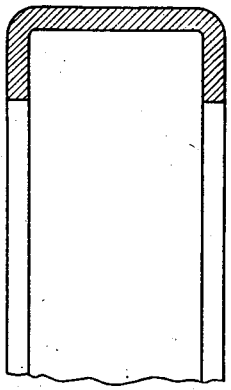

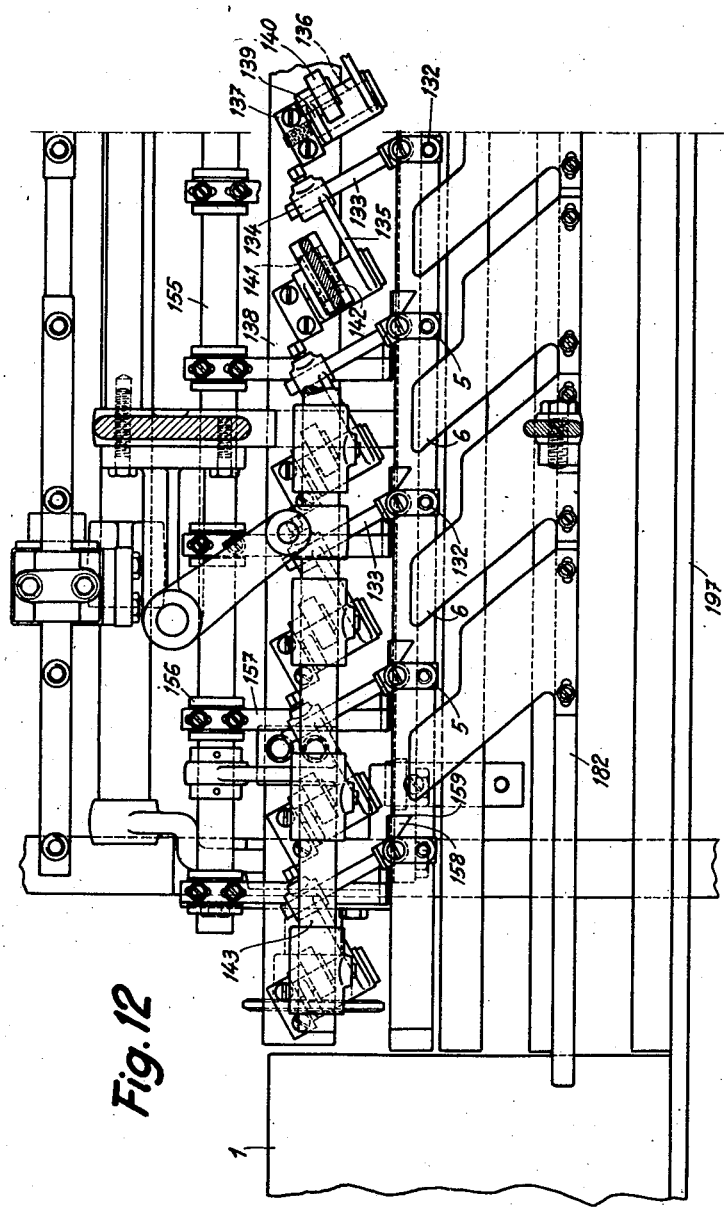

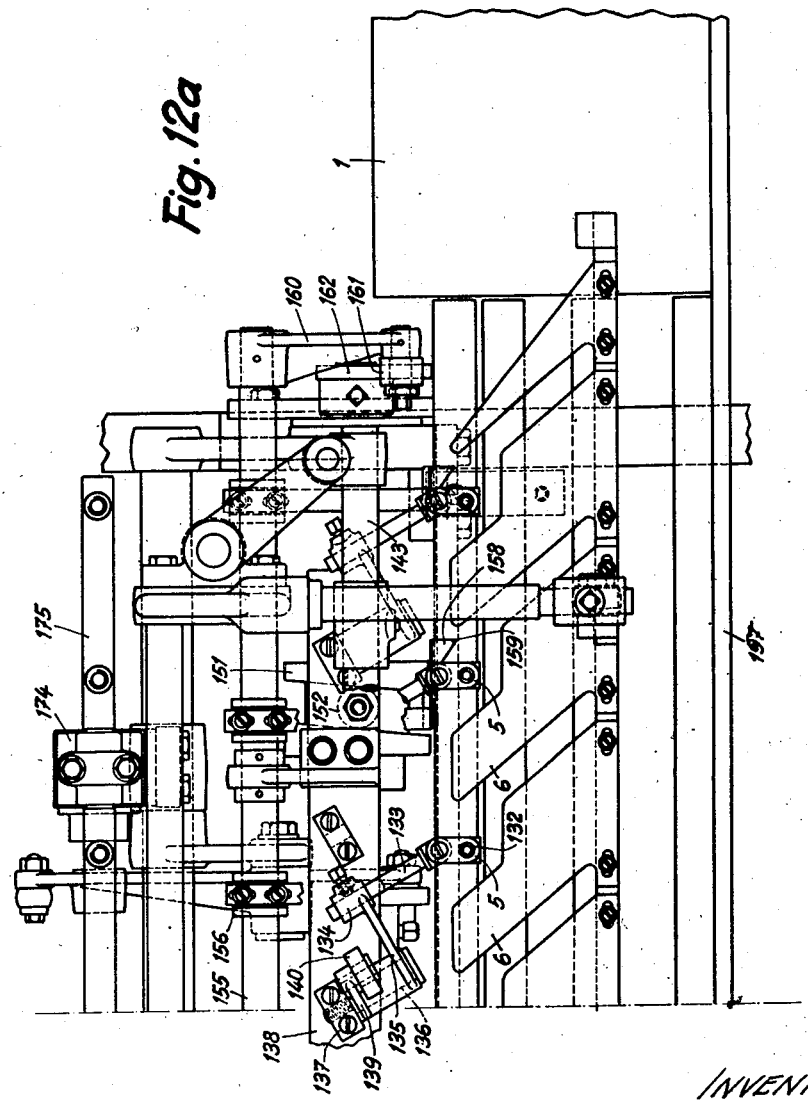

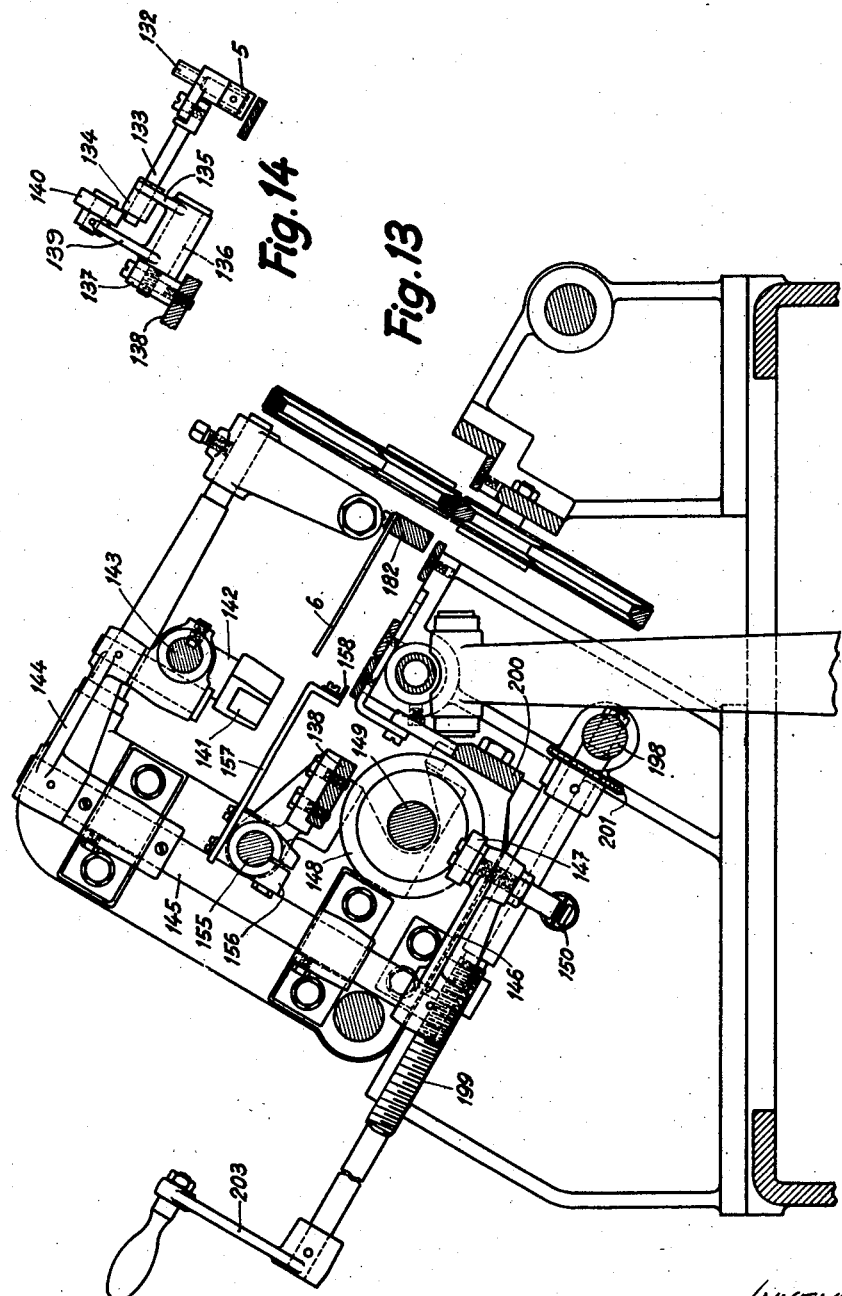

Dec. 4, 1951 R. MOSER 2,577,261
MACHINE FOR INSERTING SUPPLEMENTS INTO SIGNATURES
Filed March 19, 1947 13 Sheets-Sheet 11
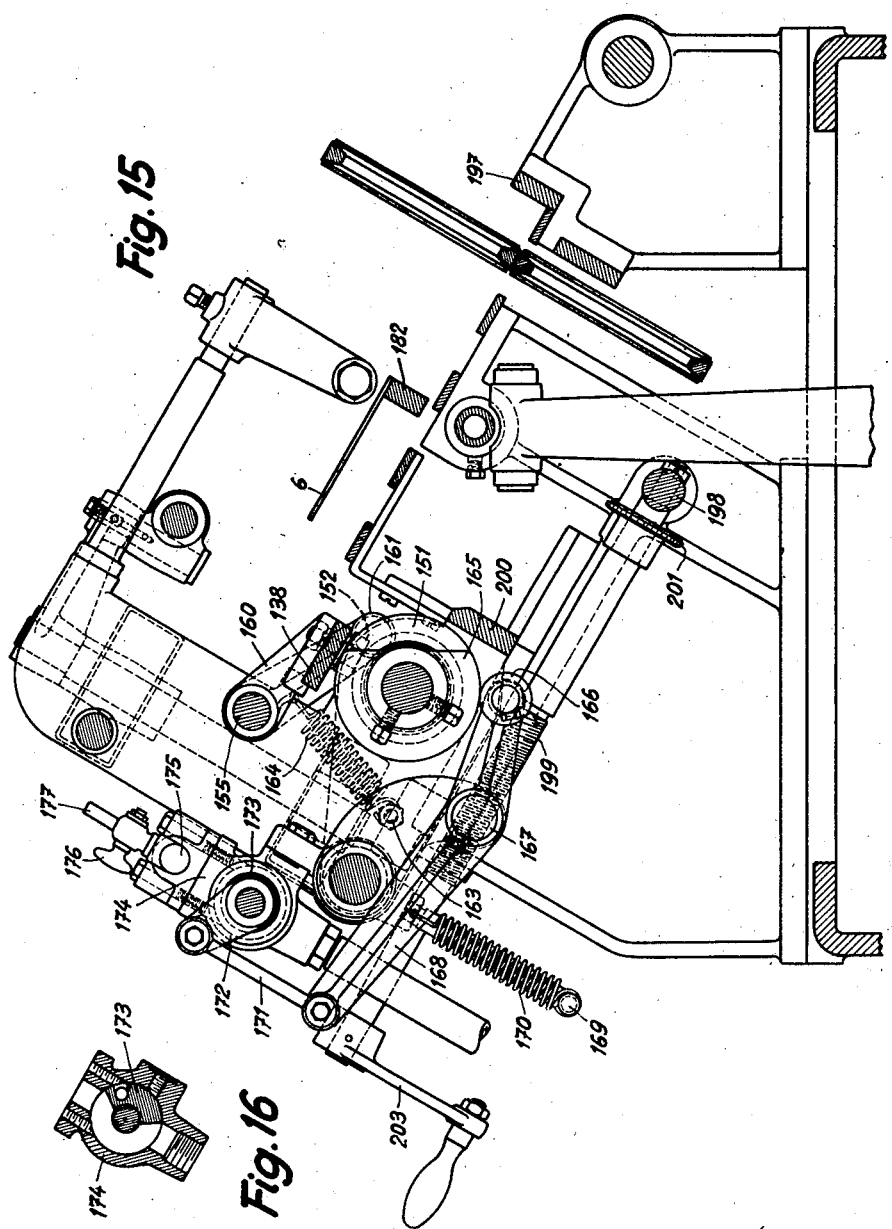
INVENTOR
RUDOLF MOSER
BY Young, Emery & Thompson
ATTYS Dec. 4, 1951  R. MOSER  2,577,261
MACHINE FOR INSERTING SUPPLEMENTS INTO SIGNATURES
Filed March 19, 1947  13 Sheets-Sheet 12
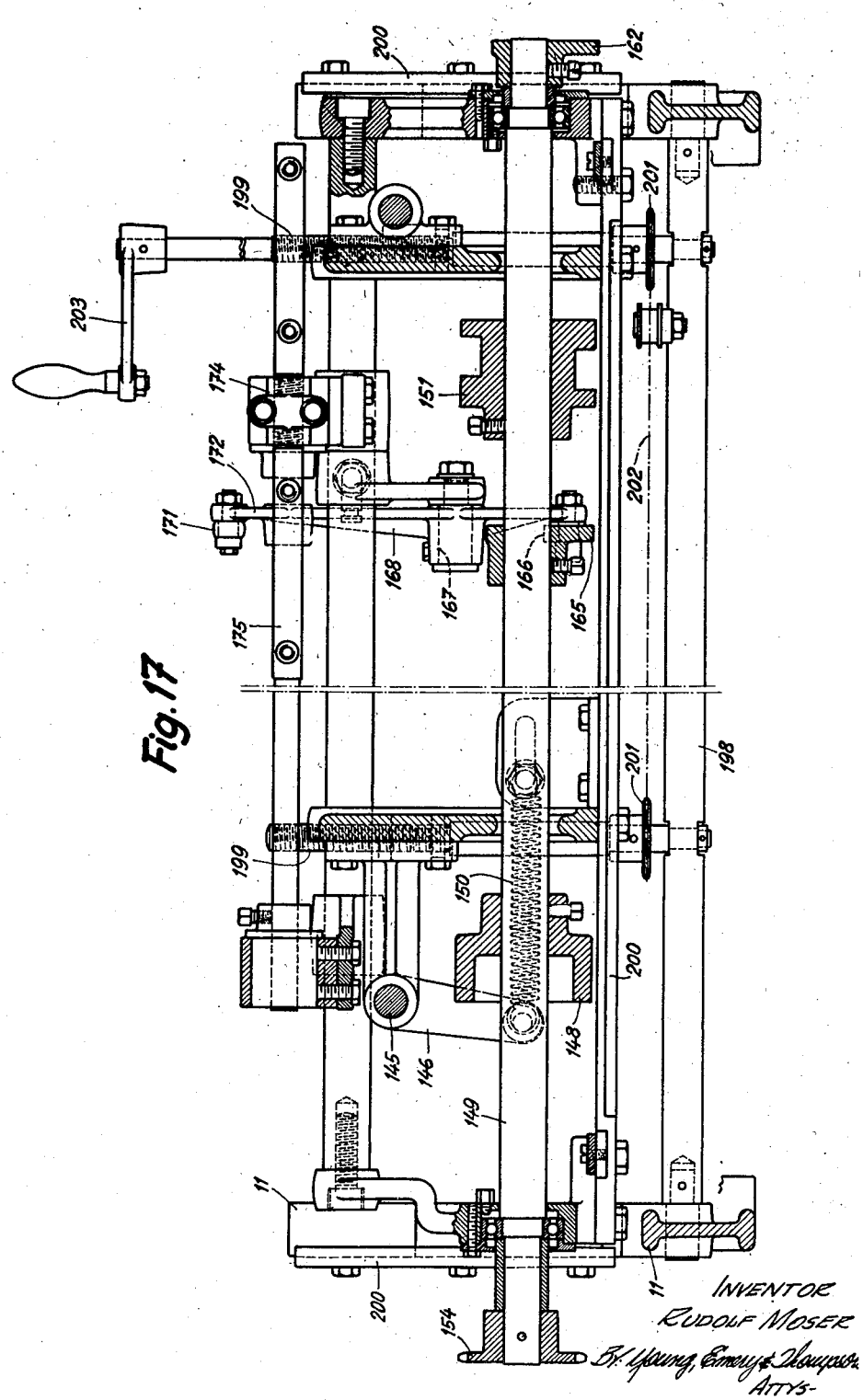

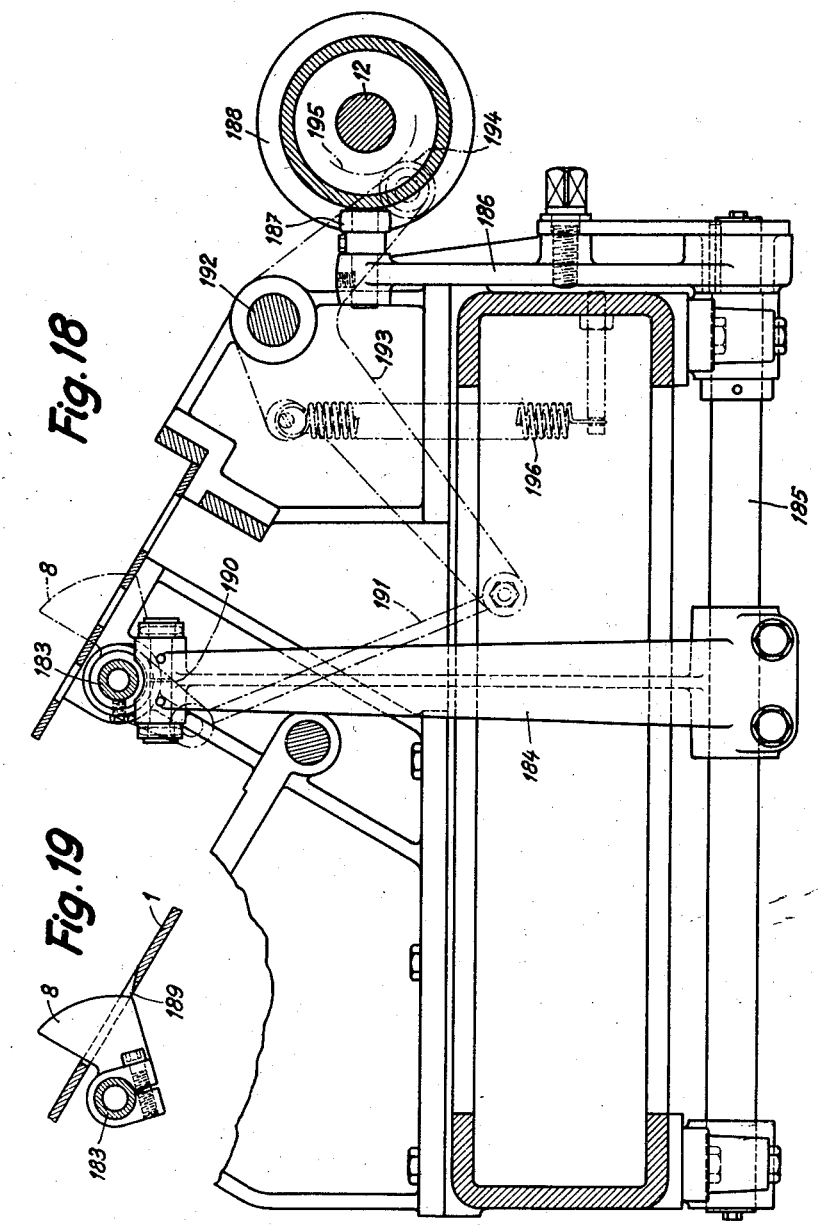

Patented Dec. 4, 1951

2,577,261

UNITED STATES PATENT OFFICE 2,577,261

MACHINE FOR INSERTING SUPPLEMENTS INTO SIGNATURES

Rudolf Moser, Lyss, Switzerland, assignor to Beweg A.-G., Berne, Switzerland

Application March 19, 1947, Serial No. 735,654 In Switzerland March 1, 1946

Section 1, Public Law 690, August 8, 1946 Patent expires March 1, 1966

4 Claims. (Cl. 270—55)

This invention relates to machines for inserting supplements into signatures, comprising suckers opening the signatures conveyed over a transporting table. In known machines of this kind, preferably used for inserting supplements into signatures open on three sides, the signatures run over the transporting table without overlapping one another. A machine of this kind is for instance shown in the U. S. Patent Specification No. 2,149,462.

Over these known machines the machine according to the invention is distinguished by the feature that the signatures run over the transporting table while overlapping one another, that is while lying one above another in the manner of tiles on a roof. Thanks to this feature more suckers can be provided on the same length than in the known machines, mentioned above, i. e., the output of a machine is considerably greater than of one of the same size and the above well-known type.

In a preferred embodiment this overlapping of the signatures on their travel over the transporting table is rendered possible in that the feed of the signatures over the table takes place intermittently. At the moment of sucking-off an edge of a sheet of the signatures all these signatures are at rest. On the subsequent movement the suckers, while acting upon the edges, accompany the signatures over a certain distance until the turned edges go under a guide plate. The guide plates lying one behind another take care that the turned edges, i. e. the sheets to be lifted of the signatures, run upon a guide bar of the inserting device provided at the hind end of the transporting table. It is understood that the invention is not limited to this embodiment.

As is well known, the inserting device at the fore end delivers the signatures to the transporting table while the hind inserting device feeds the supplements to be inserted into the opened signatures. Up till now, in these inserting devices the signatures or supplements respectively have been taken out towards the bottom. In a preferred embodiment of the invention one or both inserting devices may be designed in such a way that the signatures or supplements respectively leave the pile towards the top. Of course, this new kind of inserting device might as well be used in inserting machines of other types than the one according to the invention.

The accompanying drawings illustrate, by way of example, one embodiment of the machine according to the invention.

Fig. 1 is a top view of the machine.

Figs. 2 and 2a together show a section through the inserting device at the fore end of the machine, vertical to the horizontal mainshaft.

Fig. 3 is a section through the shaft of the gripper roller of the inserting device.

Fig. 4 is a section similar to Fig. 3 but in an opposite viewing direction.

Fig. 5 is a top view upon the gripper roller of the fore inserting device and upon the control mechanism for the gripper itself.

Fig. 6 shows the gripper roller from a place behind the machine, partly in section.

Fig. 7 is a side view of the drive of the adjusting wheels for the feed of the signature in the pile of the fore inserting device.

Figs. 8 and 8a illustrate a plan view, partly in section, of the machine with parts removed, showing mainly the mainshaft.

Fig. 10 is a further section of this drive vertical to the mainshaft, illustrating mainly the Maltese cross and its drive.

Fig. 11 is a further section through the drive of the conveying belt, showing mainly the part on the side of the pulleys.

Figs. 12 and 12a show a plan view of the machine, partly in section, showing mainly the transporting table with the guide plates, the suckers and driving parts for the latter, with the parts lying above these devices removed.

Fig. 13 is a section vertical to the mainshaft of the machine, illustrating mainly the drive of the slide conveying the signatures at the end of the transporting table and showing, besides, the size-adjusting device.

Fig. 14 shows a sucker with the parts by means of which it is connected with its drive means.

Fig. 15 is likewise a section vertical to the mainshaft of the machine, showing mainly the drive of the bar for the suckers in longitudinal and angular direction, as well as the control for the air valve of the suckers.

Fig. 16 is a section through the air valve.

Fig. 17 is a longitudinal section of a part of the machine through the axis of the control shaft for the sucker movements, driven by the mainshaft.

Fig. 18 is a section vertical to the mainshaft, illustrating the drive for the slide for conveying the signatures at the end of the transporting table.

Fig. 19 shows the slide itself in conveying direction.

Fig. 20 shows a signature to be opened for inserting supplements.

Figure 9:
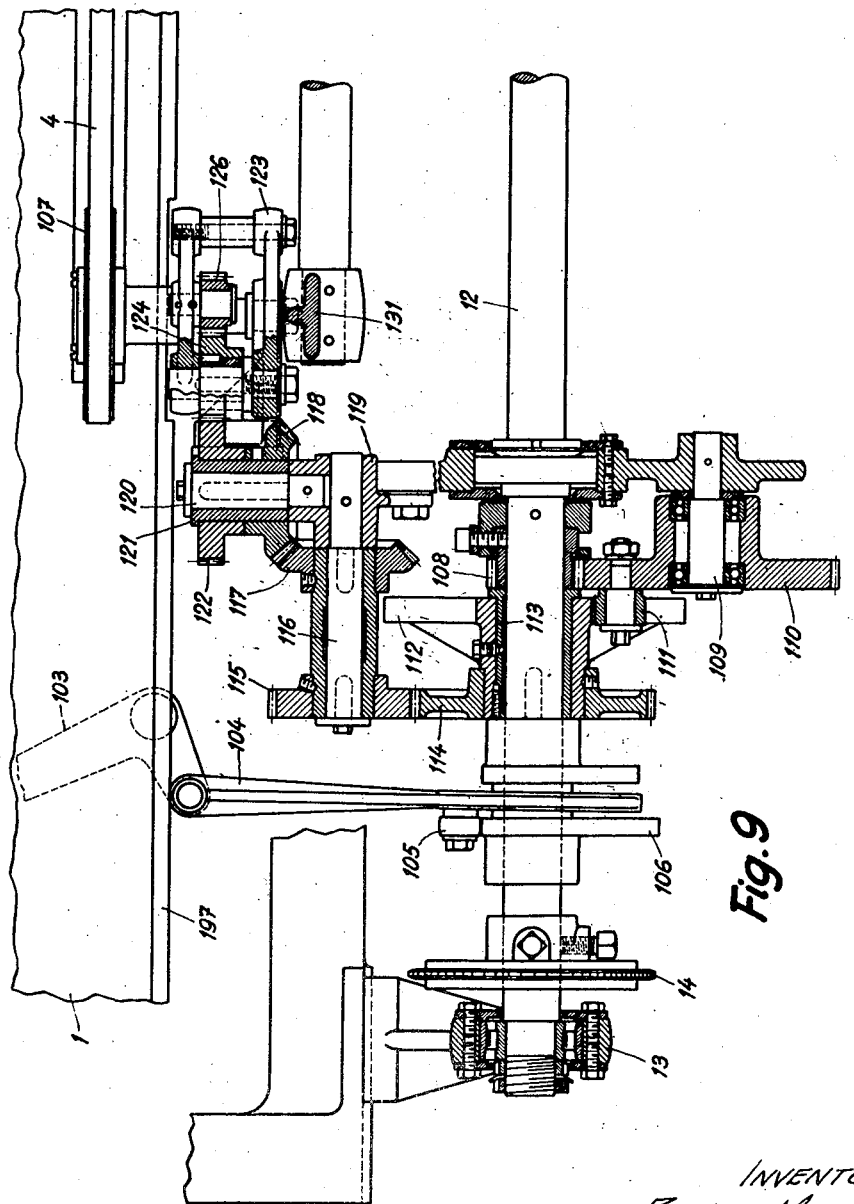
Fig. 9 is a section through the intermittent drive of the conveying belts for the signatures to be moved over the transporting table, this drive being connected with the mainshaft.

Fig. 1 shows the arrangement of the whole machine. The signatures to be opened are fed by the fore inserting device A to the desk-like transporting table 1. When these signatures 2 come from the inserting device A they fall upon the transporting table 1 in front of a slide 3. This slide moves the signatures towards the right, where they are seized by the conveying belts 4. These belts 4 move the signatures along eight suckers 5 of the middle portion B of the machine, opening one after another the edges 179 (Fig. 20) of the sheets of a signature while the edges are held in their folded position by the guide plates 6. After the eighth sucker the lifted sheets of the opened signatures run over a guide bar 7, under which the supplements 10 coming from the hind inserting device C move into the opened signatures. Then the signatures are conveyed by the slide 8 towards the outlet end of the machine where they are seized by the conveying belts 9. The signatures 2 arrive from the inserting device A in such a way that they overlap one another, i. e. that they lie with regard to one another as tiles on a roof. In this mutual position they are moved over the transporting table 1 along the suckers 5 of the middle portion B.

Referring to Figs. 2 to 7, the inserting device A may now at first be described, the inserting device A being equal to the one, C, at the outlet end of the machine.

At the front side of the machine frame 11 the mainshaft 12 driven by a motor not shown is mounted on bearings 13. A drive chain 16 runs from a chain wheel 14 of this mainshaft 12 over guide wheels 15 to a chain wheel 17 fixed to a control shaft 18 mounted on the machine frame 11. This control shaft carries a cam disc 19 and a toothed wheel 20, which is in engagement with a toothed wheel 21 of a control shaft 22, carrying cam discs 23 and 24. The toothed wheel 21 is in engagement with a toothed wheel 26 loosely arranged on a shaft 25 and rigidly connected with a toothed wheel 27 in mesh with a toothed wheel 28 of the shaft 29 of the gripper rollers 30. To the shaft 25 also two brackets 32 are fixed. The lever 31 carries a roller 33 engaging a groove 34 of the disc 19, while on the brackets 32 the shaft 29 of the gripper rollers 30 is mounted by means of ball bearings 35 in a manner shown in Fig. 6. On the gripper rollers 30 (there are two for each inserting device) the gripper 36 is swivelled on the shaft 37. The fore end 38 of the gripper is organised to cooperate with the envelope of the gripper roller 30 for holding a signature 2 sucked-off the pile 39 by the sucker 40. A spring 43 supported on the arm 41 of the shaft 37 and on the lever 42 clamped fast to the shaft 29 has the tendency to swing the gripper 36 in the anticlockwise direction (seen in Fig. 4) and to press its end 38 to the roller 30. However, for letting a signature 2 enter between the gripper 36 and the roller 30, the gripper 36 must, at the right moment, be brought into the position shown in Fig. 4. For this purpose, two cam discs 45 with cams mutually displaced by 180° are rigidly mounted on a sleeve 44 (Fig. 6) fixed to one of the brackets 32. A lever 46 (Fig. 3), rotatably mounted on the gripper roller 30, lies within reach of these cam discs and has on its free end a pin or roller 47 entering a fork 48 fixed to the shaft 37 of the gripper 36. Now, if the gripper roller turns, the lever with the pin 47 is swung twice per revolution in the anticlockwise direction (seen in Fig. 3) by the cams of the cam discs 45, so that the shaft 37 of the gripper 36, seen in Fig. 4, is rotated in the clockwise direction and the gripper 36 is brought into the lifted position shown in Fig. 4. As soon as the cams leave the lever 46, the spring 43 returns the gripper 36 into normal position. In order that a signature sucked-off the pile by the sucker 40 may be seized by the gripper 36, it must, together with the gripper roller rotating in a clockwise direction (seen in Fig. 2), be moved towards the signature. This is obtained in that the cam disc 19 swings the lever 31 and thereby the brackets 32 with the shaft 29 of the gripper roller in the anticlockwise direction and, when the gripper 36 has seized the signature, in the clockwise direction. On the brackets 32 a guide roller 50 is mounted by means of an arm 49, permanently pressed by a spring not shown against the gripping roller 30 so that the signature is conveyed between these two rollers 30 and 50 to the plate 51, wherefrom it is moved-on to the transporting table 1 by a conveying roller 52 driven by the shaft 22 in a manner not shown. A guide roller 53 cooperates with the conveying roller 52, mounted on an arm 54 and pressed permanently against the roller 52 by a spring not shown.

The cam disc 23 of the shaft 22 cooperates with the roller 55 of a lever 56, which is mounted on the machine frame by the bolt 57 in a manner not shown and which is acted upon in such a way by a spring 59 supported on a place 58 of the machine frame, that the roller 55 is permanently applied to the cam disc 23. A link 60 connects the lever 56 with an arm 62 clamped fast on a shaft 61. To this shaft 61 too, the sucker 40 is fixed, connected with a suction conduit in a manner not shown. On a movement of the cam disc 23 in the clockwise direction the lever 56 and the shaft 61 are swung to and fro, i. e. the sucker 40 is pressed against the foremost signature of the pile 39 and sucks the same on, whereupon it is seized by the grippers 36 moving towards the sucker 40 and moved on. As may be understood, the signature leaves the pile towards the top, i. e. it is drawn towards the top and moves over the gripper roller to the transporting table. In inserting devices known up to date, on the contrary, the signatures were moved towards the bottom rendering the feed to the transporting table difficult and injuring their reliability.

It is necessary that the signatures 2 in the pile 39 are permanently moved towards the sucker 40. For this purpose they are placed on conveying belts 63. These belts are intermittently driven by a pawl disc 64 loosely mounted on a shaft 67, said disc 64 being moved by a pawl 65 fixed on a lever 66 loosely placed on the shaft 67. The other arm of the lever 66 is connected over a rod 68 with an arm 69 of a lever loosely mounted on the shaft 18, whose other arm 70 carries a roller 71 which cooperates with a cam disc 24 fixed to the control shaft 22. It may thus be understood that on rotation of the control shaft 22 the arms 70 and 66, and the rod 68 and the lever 66 are moved to and fro, so that the pawl advances the pawl disc 64 and thereby the conveying belts 63 by steps in the clockwise direction.

In order that the lowermost signature 2 lying in front of the sucker is not too strongly pressed by the pile against the plate 72, so that the gripper 36 would not be able to draw this signature out, the following adjusting for the pile feed is provided: The adjusting wheels 74 rotatably mounted on the brackets 73 enter by one of their radially extending stop pins 74' at a certain distance from the lowermost signature between two signatures of the pile 39 so that the pile portion lying behind this stop pin can no longer exert an undue pressure on the signature lying before the pin 74'. These adjusting wheels 74 must be moved by steps in the anticlockwise direction in accordance with the feeding movement of the pile. The drive necessary therefor is shown in Fig. 7. On the shaft 75 of the adjusting wheel 74 there is a pawl disc 76, which is driven by steps by a pawl 77 in the anticlockwise direction. For this purpose this pawl 77 is mounted on an arm 78 loosely placed on the shaft 75 and rigidly connected with a lever 79. This lever carries a roller 80 which cooperates with a cam disc 81 fixed to the control shaft 22, this roller being permanently pressed against the disc 81 by a spring 82 fixed to the lever 79 and to the bracket 73. The brushes 84 (Fig. 2) fixed to the holder 83 are to prevent that the signature following the one sucked-off cannot adhere to the former. Therefore, the brushes serve as strippers. The finger 85 fixed to the holder 83 prevents overturning of the signatures 2.

The inserting devices A and C as well as the whole machine are provided for different sizes of signatures and supplements. The bottom 86 (Fig. 2) with the conveying belts 63 must, therefore, be adjustable in level, in order that the upper edge of signatures 2 of different size lie always on the same level, i. e. in the same position with regard to the sucker 40 and the adjusting wheels 74. For this purpose serves the threaded spindle 88 provided with a hand wheel 87 and rotatably mounted on the machine frame 11, the spindle engaging a nut 89 of a bracket 90 fixed to the bottom 86. Rotation of the hand wheel 87 in one or another direction, therefore, results in a level adjustment of the bottom 86.

As mentioned above, the signature after having fallen down from the inserting device A in Fig. 1 onto the transporting table, it lies in front of the slide 3. As illustrated in Fig. 8 this slide is fixed to a reciprocating member 100 whose part 101 carrying the slide goes through a longitudinal slot 102 provided on the transporting table. The one end of a bent lever 103 is hinged to the member 100, mounted rotatably somewhere on the machine frame 11. This lever 103 is driven by a link 104 whose one end carries a roller 105 cooperating with a cam disc 106 of the mainshaft 12. It may be seen in Fig. 8 that on rotation of the cam disc 106 the lever 103 is moved to and fro by the link 104 so that also the member 100 together with the slide 3 carries out reciprocating movements. The slide 3, in its right-hand movement, brings the signature 2 lying in front of it into the reach of the conveying belts 4. However, before the signature 2 is totally moved out of its position illustrated in Fig. 1, the slide 3 has already returned and a subsequent signature 2 has already been brought over the preceding signature which it overlaps in the manner of tiles on a roof.

As shown in Figs. 1, 9, 10 and 11, the conveying belts 4 run along the lower edge of the transporting table over rollers 107 and contact each other, so that they convey the signatures fed by the slide 3 in their overlapping position towards the right over the transporting table. These conveying belts 4 are intermittently driven in the following manner: As shown in Fig. 9, a pinion 108 fixed to the mainshaft 12 is in engagement with a toothed wheel 110 mounted on a pin 109. As especially seen in Fig. 10, this toothed wheel 110 carries three rollers 111 uniformly distributed over an imaginary circle of the wheel and driving a Maltese cross 112 loosely mounted on the mainshaft 12 by means of a sleeve 113 (Fig. 9). The hub of this Maltese cross 112 carries a toothed wheel 114 engaging a toothed wheel 115 of an intermediate shaft 116. Furthermore, a bevel wheel 117 is mounted on this intermediate shaft, cooperating with a bevel wheel 118 of a pin 120 provided perpendicularly to the intermediate shaft 116 on an angle piece 119. Rigidly connected with this bevel wheel 118 by a sleeve 121 rotatable on the pin 120 there is a spur gear 122 engaging an intermediate wheel 124 mounted on a support 123. This intermediate wheel meshes with a spur gear 125 fixed to the hollow shaft 127 of the fore roller 107 for the lower conveying belt 4, whereby the lower belt is driven. However, the intermediate wheel 124 also cooperates with another intermediate wheel 126 likewise mounted on the support 123. This intermediate wheel 126 meshes with a toothed wheel 128 screwed to the hollow shaft 127 of the fore roller 107 for the upper conveying belt 4 (Fig. 11). Both hollow shafts 127 run on ball bearings 129 of axles 130 fixed to a support 131 of the machine frame 11. On a revolution of the toothed wheel 110 three impulses are imparted to the Maltese cross; therefore, per each revolution of the wheel 110 the two conveying belts come three times to a standstill and are moved forward three times, i. e. they impart to the overlapping signatures three advance movements. Between each advance movement there is a period allowing the suckers 5 to suck-off and to lift the edge of a sheet of the signature lying uppermost. It is understood that each sucker, after having sucked-off a sheet, must also be moved forward with the sheet. Therefore, the sucker has not only to carry out a lifting but also a forward movement.

Arrangement and driving device of the eight suckers 5 are as follows:

As shown in Fig. 14, each sucker 5 with its connecting piece 132 is screwed to an arm 133 which is inserted into an eye 134 at one end of a lever 135 rotatably mounted on a support 137 by means of a bolt 136, this support being screwed to a reciprocating bar 138. The lever 135 has a second arm 139 carrying a roller 140 entering an opening 141 of an arm 142 (Fig. 13), fixed to a reciprocating rod 143. The movement of this rod taking place in the conveying direction of the signatures 2 is produced by a lever 144 engaging this rod, this lever, as is especially shown in Fig. 13, being arranged on a swinging axle 145. The lower end of this axle 145 carries a lever 146 with a roller 147 cooperating with a cam drum 148 of a control shaft 149 (Fig. 17), while a spring 150 fixed to the lever 146 and to a fixed spot provides for a permanent contact between the active surface of the cam drum 148 and the roller 147. The reciprocating movement of the bar 138 is caused by a cam drum 151 likewise on the control shaft 149 in that a roller 152 mounted on the underside of the bar (Fig. 15) engages the groove of the cam drum. The control shaft 149 receives its movement from the mainshaft 12 over a chain wheel 153 fixed to the latter, a chain not illustrated, and a chain wheel 154 on the control shaft 149 itself (Fig. 17). On the rotation of this control shaft 149 the bar 138 with all the suckers 5 is reciprocated by the cam drum 151 in the feed direction of the signatures, while by the cam drum 148 the rod 143 is moved to and fro, so that the lever 135 of each sucker 5 is moved on its pin 136 and thereby rotates the sucker 5 around the axis of this pin 136 whereby the sheet edge sucked-off by the sucker is lifted.

Especially in the case of thin sheets lying close upon one another, on lifting the uppermost sheet, danger exists that the subsequent sheet adheres to this upper sheet and is lifted too, which must be prevented lest the supplement coming from the inserting device C is inserted in a wrong place. For avoiding this, arms 157 with strippers 158 are screwed to a support 156 (Fig. 13) clamped fast to a rotatable rod 155 and to which also the bar 138 is fixed. As seen in Fig. 12a, the strippers 158 have a point 159 reaching under the upper edge of the signatures 2. The rod 155 carries a lever 160 shown in dotted lines in Fig. 15, whose roller 161 engages a cam disc 162 likewise mounted on the control shaft 149 (Fig. 17), this roller 161 being permanently pressed against the cam disc 162 by a spring 164 fixed to the lever 160 and to a fixed point 163. Every time the suckers 5 have sucked-off the edge of the upper sheet of the signature lying within reach of them, the cam disc 162 turns the rod 155 in the anticlockwise direction (seen in Fig. 15) whereby the point 159 of the strippers 158 trails across the upper edges of the sheets of the signatures, thereby stripping off a sheet eventually adhering to the sheet lifted by the sucker.

The control shaft 149 (Fig. 17) still carries another cam disc 165 serving for the control of a valve for the suction air for the suckers 5. As seen in Fig. 15, a roller 166 of a double-armed lever 168 rotatably mounted by means of the pin 167 cooperates with the cam disc 165, this roller 166 being permanently applied to the disc 165 by a spring 170 fixed to the other arm of the lever 168 and to a fixed point 169. A link 171 connected to the free end of the lever 168 is connected with an arm 172 of the rotary cock 173 of the air valve 174 shown in Fig. 16. The cam disc 165 controls this air valve 174 in a manner not shown in such a way that the suckers become effective at the desired moment. The single suckers are connected with a distribution conduit over a cock 176 and a connecting piece 177 by hoses 178 (Fig. 1) connected to the connecting piece 132 (Fig. 14). Therefore, by means of the cocks 176 each sucker 5 can be individually connected or disconnected. According to the number of sheets to be lifted in a signature either all the eight suckers or only a smaller number thereof will be put into operation.

The intermittent feed movement of the conveying belts 4, the advance movement of the suckers, the rotation of the latter, the control of the air valve 174 and also the operation of the strippers 158 are synchronised with regard to one another in such a way that the suckers suck-off one sheet at its upper edge, while the signature and the respective sucker are not moved forward. Then the strippers are operated and afterwards the forward movement of the signature and of the suckers and the rotation of the suckers begin, so that the upper fore edge 179 of the sheet 180 to be lifted of the signature shown in Fig. 20 is bent and brought upon the guide plate 6 lying behind the respective sucker. Suction is then interrupted, the sucker moves back while the signature is still moved forward for a short time by the conveying belts until the turned edge 179 of the sheet goes under the guide plate 6. The following sucker then sucks-off the corresponding edge of the subsequent sheet of the signature whereupon this sheet is brought in the manner just described under the next guide plate 6. This is repeated by all the subsequent suckers which are connected-in until all the sheets to be opened of the signature are lifted. The guide plates 6 having inclined fore and hind edges (Figs. 12, 12a) are screwed to a bar 182 running along the transporting table 1. As will be described below, they may be adjusted across the feed direction of the signatures in order to adapt their position to the size of the signatures to be opened. Adjacent guide plates 6 are arranged in such a way that, on the signatures passing from one guide plate to another, the edges already bent cannot return into unbent position.

After the last guide plate 6 a guide bar 7 is provided in longitudinal direction of the transporting table and in reach of the inserting device C in such a way that the lifted sheets still held in this position by the last guide plate 6 go upon the guide bar 7, while the lower sheets not lifted pass below this guide bar 7. During this transition from the guide plates to the guide bar 7, the signatures are no longer advanced by the intermittently driven conveying belts 4, but by continuously driven rollers 204 (Fig. 1). At the point where the sphere of action of these rollers 204 ceases, the signatures 2 are moved forward by a slide 8 whose drive will be described later on. This slide 8 brings the signatures in a correct position with regard to the inserting device C which, as already mentioned, is similar in structure as the inserting device A so that detailed description is not necessary. The supplements 10 delivered by this inserting device C, while passing below the guide bar 7, enter the opened signatures at the right place, whereupon the slide 8 moves the signatures 2 on until they come within reach of the driving belts 9 expelling them from the machine.

The slide 8 is mounted on a rotatable hollow shaft 183 lying in longitudinal direction of the transporting table (Figs. 18 and 19). This hollow shaft 183 is reciprocated in axial direction by an arm 184 engaging it. This arm is carried by an axle 185 rotatably mounted on the machine frame, this axle carrying a lever 186 on the free end of which a roller 187 is mounted, engaging a groove of a cam drum 188 fixed to the mainshaft 12. However, the slide 8 must not only be moved to and fro in longitudinal direction but, on its return movement, must also be rotated downwards in order that it no longer projects through the opening 189 of the transporting table 1. For this purpose, the hollow shaft 183 must be rotatable in both directions. As shown in Fig. 18, this is obtained in that an arm 190 is fixed to the hollow shaft 183 and connected over a link 191 with a bent lever 193 rotatable around an axle 192, said lever cooperating by means of a roller 194 with a cam disc 195 of the mainshaft 12. A spring 196 fixed to the lever 193 and to the machine frame 11 presses the roller 194 constantly against the cam disc 195. The shape and mutual position of the cam disc 195 and the cam drum 188 is so that, on a forward movement, the slide 8 projects above the opening 189, disappears below the transporting table at the end of its forward motion, returns while being turned down, and projects again beyond the opening 189 in its foremost position.

The distance necessary between the suckers 5 (and also the guide plates 6) and the lower bar 197 of the transporting table 1 varies according to the size of the signatures to be opened. The suckers 5 and the guide plates 6 must, therefore, be adjustable perpendicularly to the conveying direction of the signatures. For this purpose two threaded spindles 199 are mounted swingingly around an axle 198 of the stationary part of the machine frame 11, cooperating with nuts of an adjustable frame 200 forming part of the machine frame 11, carrying both the guide plate 6 and the suckers with their entire drive means. The threaded spindles 199 are interconnected by a chain 202 running over chain wheels 201 (Fig. 17). One of the spindles 199 has a crank 203 operable from the side of the machine opposite the mainshaft. This crank 203 being turned, its spindle 199 drives the other one by means of the chain 202 and the entire frame 200 with guide plates 6 and suckers 5 is either approached or removed from the bar 197.

From the above description it follows that in the case the signatures would not overlap one another but move one after another over the supporting table, less than eight suckers, e. g. four suckers could only be placed over the same length along the table. Therefore, with the machine according to the invention e. g. double the number of sheets can be lifted over the same table length as with the known machines mentioned in the preamble.

What I claim is:

1. In a machine for inserting supplements into signatures, a transporting table, a conveyor arranged along said transporting table to convey signatures on the latter, an inserting device at the fore end of said transporting table, comprising signature feed means, a driver arranged between said conveyor and the feed means of said inserting device, suckers provided along said transporting table to open the signatures, a main shaft, means driven by said main shaft for intermittently actuating said feed means to deposit a signature on said table, between the driver and said conveyor, means driven by said main shaft for intermittently moving the driver to shift a signature deposited on the table through a short distance onto the conveyor, which distance is less than the width of a signature, means driven by the main shaft for intermittently actuating the conveyor to move a signature shifted onto the same by the driver through a short distance less than the distance required to equal the width of a signature when added to the distance through which the signature is moved by the driver before deposition of another signature on the table by the feed means, whereby signatures will be deposited and conveyed over said table in overlapping relation along said suckers.

2. In a machine for inserting supplements into signatures, a transporting table, a conveyor arranged along said transporting table to convey signatures on the latter, an inserting device at the fore end of said transporting table, comprising feed means, a reciprocating driver arranged between said conveyor and the feed means of said inserting device, suckers provided along said transporting table to open the signatures, a main shaft, means driven by said main shaft for intermittently actuating said feed means to deposit a signature on said table, between the driver and the said conveyor, means driven by said main shaft for intermittently moving the driver to shift a signature deposited on the table through a short distance onto the conveyor, which distance is less than the width of a signature, means driven by the main shaft for intermittently actuating the conveyor to move a signature shifted onto the same by the driver through a short distance less than the distance required to equal the width of a signature when added to the distance through which the signature is moved by the driver before deposition of another signature on the table by the feed means, whereby the signature will be deposited and conveyed over said table in overlapping relation along said suckers, a mechanism for translatorily and rotatably reciprocating said suckers, air-controlling means for said suckers to suck off sheets of signatures, means driven by the main shaft for actuating the mechanism during movement of said conveyor and other means driven by said main shaft for actuating the air-controlling means between periods of movement of the conveyor to cause said suckers to suck off signature sheets at their upper edges so that upon subsequent movements of the conveyor and said suckers the signatures will be moved along said table with sheets sucked off.

3. In a machine for inserting supplements into signatures, a transporting table, a conveyor arranged along said transporting table to convey signatures on the latter, an inserting device at the fore end of said transporting table, comprising feed means, a reciprocating driver arranged between said conveyor and said inserting device, suckers provided along said transporting table to lift edges of signature sheets, guide plates on said table, arranged in reach of said suckers to hold lifted edges of signature sheets in lifted position, a main shaft, means driven by said main shaft for intermittently actuating said feed means to deposit a signature on said table, between the driver and the said conveyor, means driven by said main shaft for intermittently moving the driver to shift a signature deposited on the table through a short distance onto the conveyor, which distance is less than the width of a signature, means driven by the main shaft for intermittently actuating the conveyor to move a signature shifted onto the same by the driver through a short distance less than the distance required to equal the width of a signature when added to the distance through which the signature is moved by the driver before deposition of another signature on the table by the feed means, whereby signatures will be deposited and conveyed over said table in overlapping relation along said suckers and said guide plates, a mechanism for translatorily and rotatably reciprocating said suckers, air-controlling means for said suckers to suck off sheets of signatures, means driven by the main shaft for actuating the mechanism during movement of said conveyor and other means driven by said main shaft for actuating the air-controlling means between periods of movement of the conveyor to cause said suckers to suck off signature sheets at their upper edges so that upon subsequent movements of the conveyor and said suckers the signatures will be conveyed along said table with sheets sucked off, to bring them upon said guide plates by which they are held in lifted position.

4. In a machine for inserting supplements into signatures, a transporting table, conveying belts arranged along said transporting table and lying opposite each other to grip signatures between them for conveying the signatures on said table, an inserting device at the fore end of said transporting table, comprising feed means, a reciprocating driver arranged between said conveying belts and said inserting device, suckers provided along said transporting table to open the signatures, a main shaft, means driven by said main shaft for intermittently actuating said feed means to deposit a signature on said table, between the driver and said conveying belts, means driven by said main shaft for intermittently moving the driver to shift a signature deposited on the table through a short distance onto the conveying belts, which distance is less than the width of a signature, means driven by the main shaft for intermittently actuating the conveying belts to move a signature shifted onto the same by the driver through a short distance less than the distance required to equal the width of a signature when added to the distance through which the signature is moved by the driver before deposition of another signature on the table by the feed means, whereby signatures will be deposited and conveyed over said table in overlapping relation along said suckers, a mechanism for translatorily and rotatably reciprocating said suckers, air-controlling means for said suckers to suck off sheets of signatures, means driven by the main shaft for actuating the mechanism during movement of said conveying belts and other means driven by said main shaft for actuating the air-controlling means between periods of movement of the conveying belts to cause said suckers to suck off signature sheets at their upper edges so that upon subsequent movements of the conveying belts and said suckers the signatures will be conveyed along said table with sheets sucked off.

RUDOLF MOSER.

REFERENCES CITED

The following references are of record in the file of this patent:

UNITED STATES PATENTS

| Number | Name | Date |
|---|---|---|
| 1,043,401 | Cox | Nov. 5, 1912 |
| 1,081,838 | Kast | Dec. 16, 1913 |
| 1,586,196 | Halvorsen | May 25, 1926 |
| 1,779,130 | Hepp | Oct. 21, 1930 |
| 1,818,065 | Jones | Aug. 11, 1931 |
| 2,076,700 | Bryce | Apr. 13, 1937 |
| 2,149,462 | Oppliger | Mar. 7, 1939 |